Figure 1:
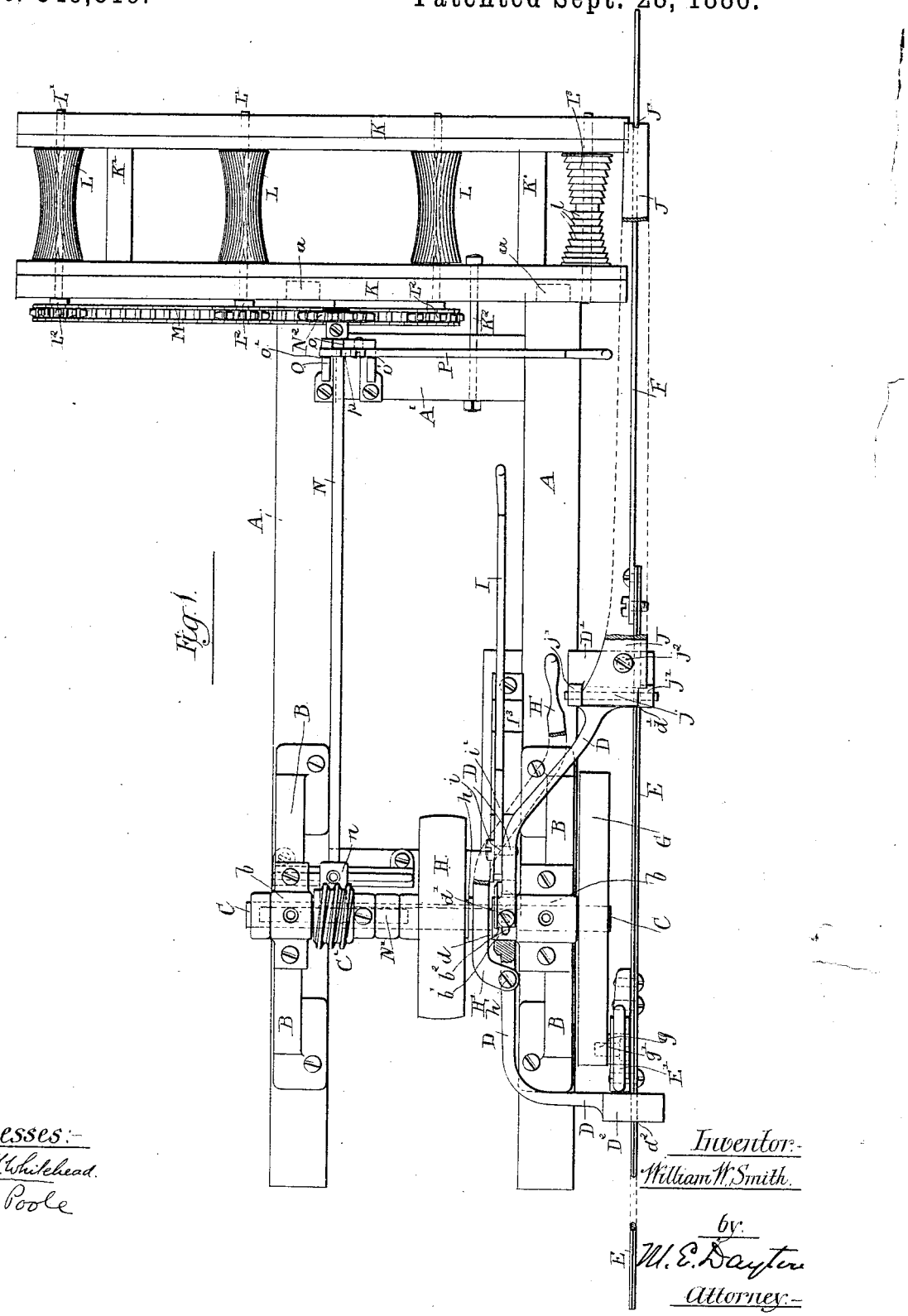

(No Model.) 2 Sheets—Sheet 1.
W. W. SMITH.
DRAG SAW.

No. 349,819. Patented Sept. 28, 1886.

Witnesses:
Louis M. F. Whitehead.
C. C. Poole

Inventor:
William W. Smith
by
M. E. Dayton
Attorney

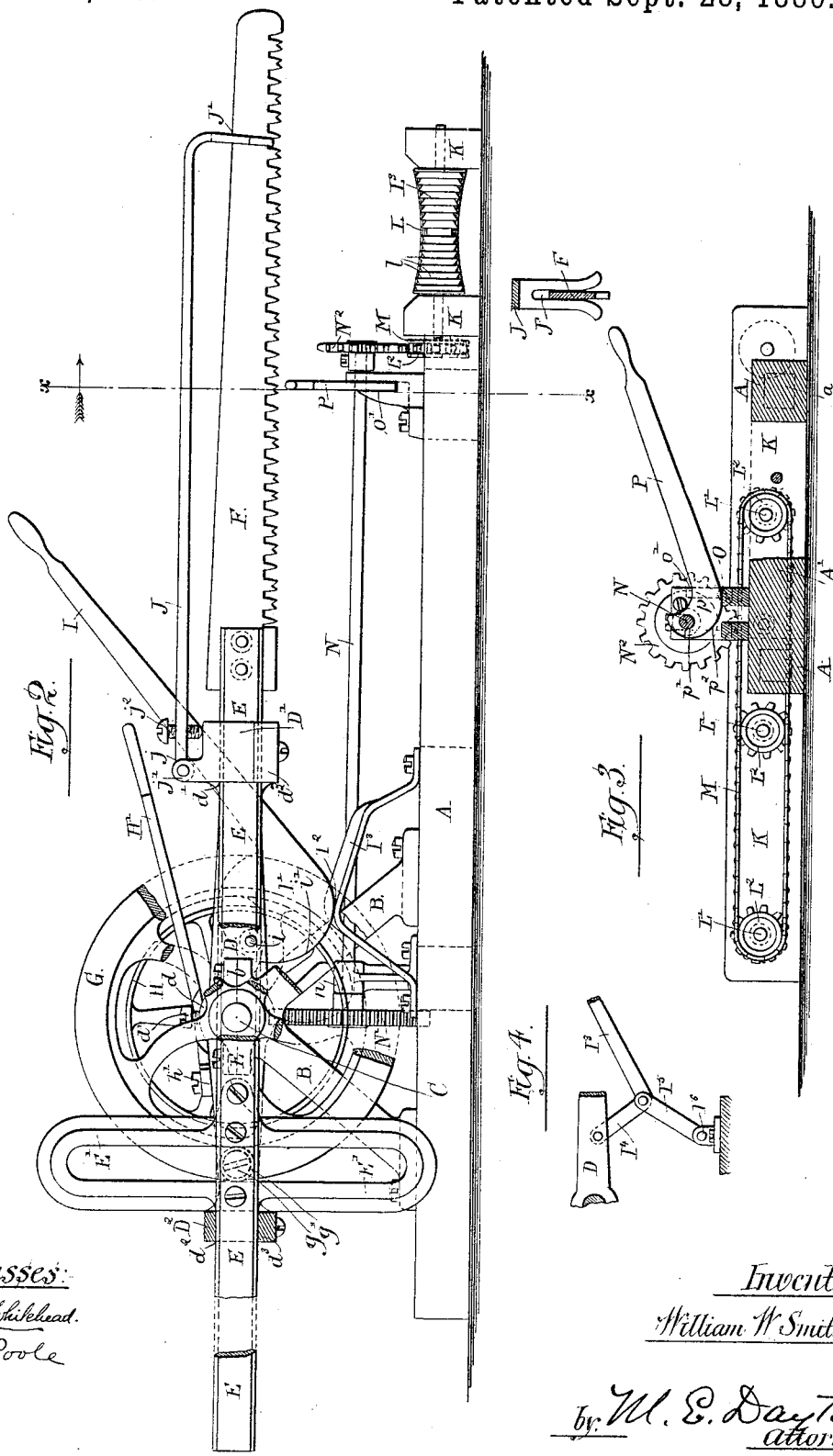

UNITED STATES PATENT OFFICE.

WILLIAM W. SMITH, OF CHICAGO, ILLINOIS, ASSIGNOR OF ONE-HALF TO GEORGE R. THAMER, OF SAME PLACE.

DRAG-SAW.

SPECIFICATION forming part of Letters Patent No. 349,819, dated September 28, 1886.

Application filed March 29, 1886. Serial No. 196,878. (No model.)

*To all whom it may concern:*

Be it known that I, WILLIAM W. SMITH, of Chicago, in the county of Cook and State of Illinois, have invented certain new and useful Improvements in Sawing-Machines; and I do hereby declare that the following is a full, clear, and exact description thereof, reference being had to the accompanying drawings, and to the letters of reference marked thereon, which form a part of this specification.

In Letters Patent No. 326,343, granted to me September 15, 1885, I have illustrated a sawing-machine having a horizontally-reciprocating or crosscut saw, and in which the saw is connected with a vertically-slotted bar that is pivoted at its upper end to the machine-frame, and in the slot of which works the pin of a crank connected with a shaft that is therein shown as being rotated by foot or hand power, or both.

The present invention has for one of its objects to provide a different mode of supporting the slotted member to which the saw is connected, whereby a machine containing this mode of applying rotary motion to the actuation of the saw may be better suited to the use of steam or other power.

Another object of the invention is to provide a means for sustaining the saw and reciprocating parts connected with the saw, whereby the latter will be caused to advance through the wood in cutting by the gravity of the saw and certain of the parts connected therewith.

A sawing-machine embodying my invention is herein illustrated, which comprises a suitable frame or support in which is mounted a horizontal driving-shaft provided with a belt-pulley, and also with a crank and pin, through the medium of which a reciprocatory movement is given to the saw. The said machine is provided with an oscillating saw-carrying frame having its pivotal support concentric with the driving-shaft, said oscillating frame being constructed to afford bearings for a sliding bar, which is provided with a yoke having a straight transverse slot engaging the crank-pin, this construction affording a means whereby an equal reciprocating movement is given to the saw, in whatever angular position the saw-carrying frame is placed, while at the same time the saw is adapted to swing freely toward and away from the work. The said machine illustrated embodies also an improved device for elevating the saw and sustaining it free from the work, means for moving the logs or timber to be sawed by power, and other improved features of construction in a sawing-machine, as will be hereinafter fully set forth.

In the accompanying drawings, Figure 1 is a plan view of a sawing-machine embodying my invention. Fig. 2 is a side elevation of the same. Fig. 3 is a sectional view illustrating parts shown in Figs. 1 and 2, taken upon line $x$ $x$ of Fig. 2. Fig. 4 illustrates a device for lifting the saw from the work, differing in some respects from that shown in Figs. 1 and 2.

As illustrated in said drawings, A indicates a bed or frame upon which the several parts of the machine are supported; B B, brackets or standards attached to the said frame; C, the main driving-shaft, which is arranged horizontally in bearings $b$ $b$ upon the standards B B; D, an oscillating frame, which is pivotally supported concentrically with the axis of the shaft C; E, a sliding or reciprocating saw-carrying bar or saw-carrier, which is sustained in suitable bearings or guides in the frame D; F, a saw, which is attached to one end of the bar E; and G, a wheel mounted on said shaft and provided with a crank-pin, $g$, which is engaged with a slotted transverse yoke, E', attached to the saw carrier or bar E in such manner as to give a reciprocating movement to the said bar and the saw when the shaft is rotated.

The shaft C is provided with a belt-pulley, H, whereby rotary motion may be transmitted thereto by means of a belt from a steam-engine or other motor. Said pulley is herein shown as detachably connected with the shaft by means of a clutch, $h$, which may be of any familiar or preferred construction. Said clutch is, as herein shown, actuated by a hand-lever, H', which is pivoted at $h'$ to the oscillating saw-carrying frame D, and extends toward the end of the saw for the convenience of an operator standing in position to operate levers which control the operation of other parts of the machine. As far as the main features of the invention are concerned, however, said clutch and lever may be otherwise arranged in practice as may be found desirable or convenient.

In the particular construction of the parts herein illustrated the frame D is mounted upon a sleeve or bearing, $b'$, upon the shaft-bearing $b$, adjacent to the wheel G, the frame being provided with a hub, $d$, through which is inserted a set-screw, $d'$, entering a groove, $d^2$, formed in the sleeve $b'$, to prevent the hub shifting upon the sleeve, as clearly shown in Fig. 1. The end portions or arms of the frame D are in this case bent outwardly at each side of the crank-wheel, and are provided upon their ends with heads or blocks $D' D^2$, formed to provide guide apertures or bearings $d' d^2$, in which the carrier-bar E is constructed to fit and slide. Said heads $D' D^2$ are shown in the drawings as provided with removable pieces or caps $d^3 d^3$, closing the lower ends of the said apertures $d' d^2$, whereby the bar E may be readily removed from the frame when desired.

The yoke E' is attached to the side of the bar E, adjacent to the wheel G, in position to engage the crank-pin $g$, said pin preferably being provided with an anti-friction roller, $g'$, to enable it to travel with a minimum of friction in the slot of the yoke. The saw F is adapted to move bodily in a vertical plane, so as to advance through the wood in sawing by the oscillatory movement of the frame D, and in the particular machine shown the desired forward or feed movement of the saw is obtained by an excess or preponderance of weight in the end of the oscillating frame D, to which the saw is attached. It may be here remarked, however, that in case the saw is arranged otherwise than horizontally, or when for other reasons it is found undesirable to rely solely upon the gravity of the saw or connected parts for advancing the saw to its work, devices may obviously be provided for giving a positive forward or feed movement to the saw.

By the construction described in the devices for actuating and supporting the saw the saw may be actuated with the same facility, at whatever angle in a vertical plane it is placed, it being entirely obvious that inasmuch as the frame D is arranged to oscillate concentrically with the shaft the yoke E' will bear the same relation to the crank-pin in all positions of the frame.

In order to enable the saw to be elevated and held clear from the work when desired, as may be necessary in moving a log for making a new cut, and under other circumstances, means are herein provided consisting of a lever, I, which is pivoted at $i$ to the frame D, and is provided adjacent to its pivot with a short arm or part, I', having a curved or cam surface, $i'$, adapted to engage a bearing-surface, $I^2$, upon the frame, so as throw the end of the frame D, to which the saw is attached, upwardly, and to hold said end of the frame and the saw carried thereby in an elevated position. In the particular construction illustrated the bearing-surface $I^2$ for the cam-surface $i'$ is formed upon a metal piece or casting, $I^3$, sustained from the frame A by means of legs or standards, as shown; but said bearing-surface may be arranged otherwise in practice, as may be found desirable or convenient. It will of course be understood that, as far as the operation of the other parts of the machine are concerned, any other suitable device or devices may be substituted for the lever I for the purpose of lifting the saw, or for sustaining the latter when elevated.

I have shown in the drawings a guide-arm, J, which is pivoted at one end to the frame D in such manner as to extend outwardly over the saw, said guide-arm being provided at its free end with a notched guide, J', adapted to engage the upper edge of the saw, so as to hold the latter from lateral movement. Said saw-guide is sustained by pivots $j j$, fixed in lugs $j' j'$ upon the block or head D', in such manner that the free end of said guide may be swung upward away from the saw, after the latter has entered the log, in a well-known manner.

As an improved construction in a saw-guide of the character shown, said guide is provided at a point adjacent to its pivot with a stop or support for preventing the weight of the free end of the guide from resting upon the saw, said stop or support preferably consisting of a set-screw, $j^2$, inserted vertically through the guide, so as to bear at its lower end against the said head D'. By this construction the downward movement of the free end of the guide may obviously be adjusted relatively to the saw.

In connection with the parts above described I have herein shown an improved device for sustaining logs or timbers to be operated upon in proper position relatively to the saw, and for advancing them toward the saw at desired intervals, and also devices for moving the said logs or timbers by power obtained from the driving-shaft of the machine. The main part of the log-supporting device consists of two timbers, K K, arranged transversely to the saw, and two or more rollers, L L, mounted upon and between said timbers K K, said rollers being desirably made of concave form, or smaller at their middle parts than at their ends, as shown. The devices herein shown, and preferably employed for actuating the said rollers so as to advance the log toward the saw at desired intervals, are made as follows: Two or more of the said rollers are provided with shafts L' L', passing through the timber K, adjacent to the main part of the machine, and provided with sprocket-wheels $L^2 L^2$, over which are trained a chain belt, M. Mounted horizontally over the bed A of the machine, in a direction transverse to the timbers K and parallel with the saw, is a shaft, N, which is extended at its end adjacent to the shaft C to a point beneath the latter, and is provided with a worm-wheel, N', intermeshing with a worm, C', upon the said shaft C, whereby said shaft N is driven constantly when the said driving-shaft is rotated. The shaft N is held in a bearing, n, at its end adjacent to the worm-wheel N′, and the opposite or outer end of said shaft is made vertically movable and provided with a sprocket-wheel, N², located over and adapted to engage the chain belt M. Said shaft is held in a vertically-movable bearing at a point adjacent to the wheel N², and means are provided for raising and lowering the said shaft and the sprocket-wheel, whereby the latter may be engaged with and disengaged from the chain belt M, as desired, for the purpose of stopping and starting the log-moving device. By this means it is entirely obvious that the log or timber resting upon the rollers L L may be moved to any extent desired, when the machine is in motion, by dropping the revolving wheel N² into engagement with the chain belt, or by raising said wheel so as to disengage it from the said belt.

The particular device herein shown for sustaining and moving the free end of the shaft N consists of a casting or standard, O, provided with a vertical slot, o, adapted to receive and guide the said shaft, and having two guide-slots, o′, formed at either side of the shaft, to receive the end part, p, of a transversely-arranged lever, P, which is provided in said part p with an aperture, p′, engaging the shaft N. The said lever is provided with a curved or cam-shaped lower surface, p², engaging an opposing surface of the casting O in such manner as to raise and lower the shaft when the free end of the lever is moved, said surface p² being so shaped as to cause the lifting of the shaft when the outer end of the lever is depressed, said outer end of the lever being preferably made of sufficient weight to sustain the shaft in an elevated position, so that when the sprocket-wheel is disengaged from the chain M it will not become re-engaged therewith unless the lever is especially moved for the purpose of affecting such engagement.

I preferably locate the lever I in such position that its free end extends toward the log-feeding devices above described, and arrange the lever P in such manner as to project toward the saw, so that the ends of said levers I and P are near each other, and in such position that both may be operated by a person standing in one place and in convenient position for observing the operation of the saw.

The timbers K K of the log-feeding device are preferably connected by cross-timbers K′, so as to form a rigid frame, and said frame is connected with the main frame A of the sawing-machine, preferably by means allowing the frames to be detached from each other for convenience in transportation, while at the same time allowing them to be rigidly connected in setting up parts of the machine for work. In the particular construction illustrated the connecting devices between said frames consist of tenons a upon the main timbers of the frame A, which tenons enter mortises in the frame-piece K, together with a tie-bolt, K², passing through the said timber K and an adjacent cross-piece, A′, of the frame A, whereby the said parts may be closely drawn and held together.

The rollers L are desirably roughened or ridged longitudinally, so as to engage and feed forward a log resting upon them, and in addition to said rollers, which are driven by the actuating devices above described, I preferably provide another roller, L³, at the end of the frame K K′ adjacent to the saw, said roller last mentioned being provided with annular ridges l, having sharpened or acute edges, and adapted to prevent lateral slipping or sidewise movement of a log or timber resting upon said roller during the forward movement of said log or timber.

In Fig. 4 of the drawings I have illustrated another device, whereby the frame D may be moved for the purpose of elevating the saw and sustaining it clear of the work. In this instance a lever, I³, is employed, which is bent at its inner end to form one part or member, I⁴, of a toggle-joint, which part or member is pivoted to the frame D. The other member, I⁵, of said toggle-joint is pivotally connected at its lower end to a suitable lug or projection, I⁶, upon the frame A, and pivotally connected with the lever I³ at the point at which the latter is attached to the arm I⁴, as clearly shown in the drawings. It is entirely obvious that this device may take the place of the lever and cam before described as a means of moving the frame D, and that said device, when employed, may be used not only for lifting the frame D and the saw, but for depressing said frame, and thereby carrying the saw through the log or other work being operated upon, so as to give a positive control of or forward feed movement to the saw, which may be very desirable in some cases or situations. Such a device, for instance, may be applied in a case where the saw is arranged in such manner that its weight cannot be utilized for producing such forward or feed movement, as, for instance, when the saw is arranged vertically.

An important advantage gained by the use of the rotating feed-rollers L, herein shown, over the log-carrying carriage heretofore generally used in saw mills and sawing-machines is that said rollers operate to feed a log or logs continuously, so that after one log is cut up it is not necessary to readjust the parts for bringing a new log into position, as is the case when a carriage is used, but the logs may be put on one after another, or in such manner that one immediately follows the other in an obvious manner. It will of course be understood that when a carriage is used it becomes necessary, after each log has been cut up, to run the carriage back into position to receive a new log, and that this operation must be repeated after each log is cut up. By the employment of the feed-rollers, as herein shown, on the contrary, the logs may obviously be placed upon the rollers one after another, as before described, and it therefore becomes unnecessary to temporarily cease work while a new log is being put in place for the operation of the saw, so that the sawing may be accomplished much more rapidly by the employment of said continuously-operating rollers than by devices heretofore used for the purpose.

I am aware that it has been common heretofore to employ in gang-saw mills continuously-rotating feed-rollers for feeding the log continuously to the saw, and also that in sawing-machines employing a drag-saw single feed-rollers have been used in connection with a carriage sustaining the weight of the log, or a principal part thereof, and that in one instance a roller has been mounted upon such carriage. The novel construction in the feeding devices herein shown, embracing a series of rollers for supporting the logs, and driving devices giving a rotary motion to said rollers, having detachable connection with the latter, has the important advantage over those heretofore employed in enabling the carriage and means for giving reciprocating motion thereto to be dispensed with, while at the same time facilitating the operation of feeding the logs to the saw, as above set forth.

It is to be understood that my invention is not limited to the particular details of construction present in the device herein shown as one particular way of carrying out my invention, except as such details may form the subject of specific claims herein.

I claim as my invention—

1. The combination, with a drive-shaft provided with a crank and crank-pin, of an oscillating carrier-frame mounted to rotate about the axis of the shaft, and a reciprocating saw-carrying bar sliding in guides in said frame, and provided with a slotted yoke engaging said crank-pin, substantially as described.

2. The combination, with a drive-shaft provided with a crank and a crank-pin, of a carrier-frame mounted to oscillate about the axis of the shaft, and a reciprocating saw-carrying bar sliding in guides in said frame, and provided with a slotted yoke engaging said crank-pin, a belt-pulley mounted upon the drive-shaft, and a clutch mechanism connecting the pulley with the shaft, substantially as described.

3. The combination, with a saw, a reciprocating saw-carrying bar, and a frame affording guides for said bar, of a saw-guide connected at one end with the said frame, and provided with a guide-notch for the saw, said guide being sustained without resting upon the saw, substantially as described.

4. The combination, with a saw, a reciprocating saw-carrying bar, and a frame affording guides for said bar, of a saw guide connected at one end with the frame and extending toward the free end of the saw, and means for changing the vertical position of the outer end of said guide vertically with relation to the saw, and for holding said guide immovably in its changed position, substantially as described.

5. The combination, with a reciprocating saw-carrying bar and a frame affording guides for said bar, of a saw-guide pivotally connected with the frame, and a set-screw applied between the guide and frame to limit the downward movement of the outer end of the said guide and to adjust the position of the guide relatively to the saw, substantially as described.

6. The combination, with a sawing-machine provided with a drag or crosscut saw, of a log-carrier comprising a series of revolving rollers mounted in stationary bearings and sustaining the log in a position transverse to the saw, said rollers affording the sole support for the log, and driving devices for giving rotary motion to the rollers, comprising a rotating part having detachable connection with two or more of said rollers, whereby the log may be intermittingly advanced to the saw, substantially as described.

7. The combination, with a drive-shaft and the rollers of a log-carrier, of intermediate driving-connections for actuating the said rollers from the shaft, comprising a chain belt engaging sprocket-wheels upon the shafts of two or more of the rollers, and a shaft provided with a sprocket-wheel adapted for engagement with the belt, said shaft being movable relatively to the belt at its end adjacent to the said belt, whereby the sprocket-wheel of said shaft may be engaged with and disengaged from said belt at will, substantially as described.

8. The combination, with a drive-shaft and the rollers of a log-carrier, of intermediate driving-connections for actuating the said rollers from the shaft, comprising a chain belt engaging sprocket-wheels upon the shaft, a shaft provided with a sprocket-wheel adapted for engagement with the belt, and a hand-lever engaging the shaft, whereby the latter may be moved for bringing the sprocket-wheel into and out of engagement with the belt, substantially as described.

9. The combination, with a drive-shaft and the rollers of a log feeding or carrying device, of a worm upon the drive-shaft, a shaft extending from the drive-shaft to the said rollers, a worm-wheel upon said shaft engaging said worm, a sprocket-wheel upon the end of said shaft adjacent to the rollers, sprocket-wheels connected with two or more of the roller-shafts, a chain belt trained over said sprocket-wheels last mentioned, and a hand-lever connected with the end of said shaft adjacent to the rollers for raising and lowering the said end of the shaft, substantially as described.

10. The combination, with a horizontal chain belt connected with and actuating a log-carrier, of a horizontal shaft provided with a sprocket-wheel adapted to engage the chain belt, said shaft being vertically movable at its end adjacent to the belt, and a hand-lever connected with the said shaft, said hand-lever being made of sufficient weight at its outer end to sustain the shaft normally in its elevated position, substantially as described.

11. The combination, with an oscillating carrier-frame, a reciprocating saw-carrying bar mounted in said frame, and a saw attached to said bar, said frame being arranged to afford a preponderance of weight at its end adjacent to the saw, of a hand-lever pivoted to the frame and provided with a cam-surface engaging a suitable stationary part or surface, whereby the saw may be lifted and held in its elevated position, substantially as described.

In testimony that I claim the foregoing as my invention I affix my signature in presence of two witnesses.

WILLIAM W. SMITH.

Witnesses:
C. CLARENCE POOLE,
CHAS. E. FISHER.